(12) United States Patent
Asai

(10) Patent No.: US 10,304,616 B2
(45) Date of Patent: May 28, 2019

(54) CONTACTLESS CHARGING DEVICE FOR VEHICLE

(71) Applicant: NISSAN MOTOR CO., LTD., Yokohama-shi, Kanagawa (JP)

(72) Inventor: Akihiro Asai, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/564,547

(22) PCT Filed: Apr. 8, 2015

(86) PCT No.: PCT/JP2015/060936
§ 371 (c)(1),
(2) Date: Oct. 5, 2017

(87) PCT Pub. No.: WO2016/162966
PCT Pub. Date: Oct. 13, 2016

(65) Prior Publication Data
US 2018/0082779 A1    Mar. 22, 2018

(51) Int. Cl.
*H02J 7/02* (2016.01)
*B60L 11/18* (2006.01)
*H01F 27/28* (2006.01)
*H01F 38/14* (2006.01)
*H02J 50/10* (2016.01)

(52) U.S. Cl.
CPC ........ *H01F 27/2876* (2013.01); *B60L 11/182* (2013.01); *H01F 38/14* (2013.01); *H02J 7/025* (2013.01); *H02J 50/10* (2016.02)

(58) Field of Classification Search
USPC ........................................................ 320/108
See application file for complete search history.

(56) References Cited

U.S. PATENT DOCUMENTS

| 2010/0065352 A1 | 3/2010 | Ichikawa | |
| 2015/0061583 A1* | 3/2015 | Nakamura | H01F 27/36 320/108 |
| 2015/0091511 A1* | 4/2015 | Ichikawa | H02J 17/00 320/108 |

FOREIGN PATENT DOCUMENTS

| JP | 6-188343 A | 7/1994 |
| JP | 2012-85472 A | 4/2012 |
| JP | 2014-193692 A | 10/2014 |
| JP | 2014-226016 A | 12/2014 |
| WO | WO 2013/038591 A1 | 3/2013 |

\* cited by examiner

*Primary Examiner* — Robert J Grant
(74) *Attorney, Agent, or Firm* — Foley & Lardner LLP

(57) ABSTRACT

It includes an electricity receiving coil unit having an electricity receiving coil that generates heats due to electrical conduction thererof, an electric component storage box having a rectifier, and a harness electrically connecting the electricity receiving coil unit and the electric component storage box with each other. Part of the harness is routed in a vicinity of a front end of an upper face of the electricity receiving coil unit. Flows are made turbulent when traveling air hits the harness, and thereby airflows behind the harness turn into turbulence. Even if affixes such as mud fixate on the upper face of the electricity receiving coil unit, the affixes are removed by the turbulence.

5 Claims, 7 Drawing Sheets

US 10,304,616 B2

CONTACTLESS CHARGING DEVICE FOR VEHICLE

TECHNICAL FIELD

The present invention relates to a contactless charging device for a vehicle that can be applied to an electric vehicle and so on, for example.

BACKGROUND ART

Conventionally, known is a contactless charging device for a vehicle that receives electricity sent from an electricity sending coil unit by its electricity receiving coil unit in a contactless manner and then charges the electricity to a battery (see Patent Literature 1). In this Patent Literature 1, the electricity sending coil unit is disposed on a ground side, and the electricity receiving coil unit and the battery are mounted on the vehicle. Here, the electricity receiving coil unit has an electricity receiving coil, and thereby has heat-generation characteristic due to electrical conduction for charging the battery.

CITATION LIST

Prior-art Literature

Patent Literature 1: Japanese Unexamined Patent Application Publication No. 2012-85472

SUMMARY OF INVENTION

Problem to be Solved by Invention

Here, since an upper face of the electricity receiving coil unit disclosed in the Patent Literature 1 is formed flat, mud or the like on a road surface easily fixates on the upper face of the electricity receiving coil as affixes while the vehicle runs. In such a case, it is concerned that heat radiation from the upper face of the electricity receiving coil unit may be restricted by the affixes.

Therefore, the present invention intends to improve heat-radiation performance of an electricity receiving coil unit by restricting affixes from fixating onto an upper face of the electricity receiving coil unit.

Means for Solving Problem

In a contactless charging device for a vehicle according to the present invention, an electricity receiving coil unit provided with an electricity receiving coil and an electrical component storage box having at least a rectifier are connected with each other while interposing a harness therebetween. At least part of the harness is routed in a vicinity of a front end of the upper face of the electricity receiving coil unit.

Advantageous Effect of Invention

While a vehicle runs, traveling air hits the at least part of the harness routed in the vicinity of the front end of the upper face of the electricity receiving coil unit. Then, flows of the traveling air are made turbulent by the harness to turn airflows behind the harness into turbulence, and thereby flow rearward while contacting with the upper face of the electricity receiving coil unit. Therefore, even if affixes such as mud fixate on the upper face of the electricity receiving coil unit, the affixes are removed by the turbulence and thereby heat radiation performance of the electricity receiving coil unit can be maintained high.

DESCRIPTION OF EMBODIMENTS

Hereinafter, embodiments of the present invention will be described. Note that FR indicates a front of a vehicle, RR indicates a rear of a vehicle, RH indicates a right side in a vehicle width direction, LH indicates a left side in the vehicle width direction, UP indicates an upper-side of the vehicle, and a LW indicates a lower-side of the vehicle.

[First Embodiment]

Hereinafter, a first embodiment of the present invention will be described by using FIG. 1 to FIG. 4.

Figure 1:
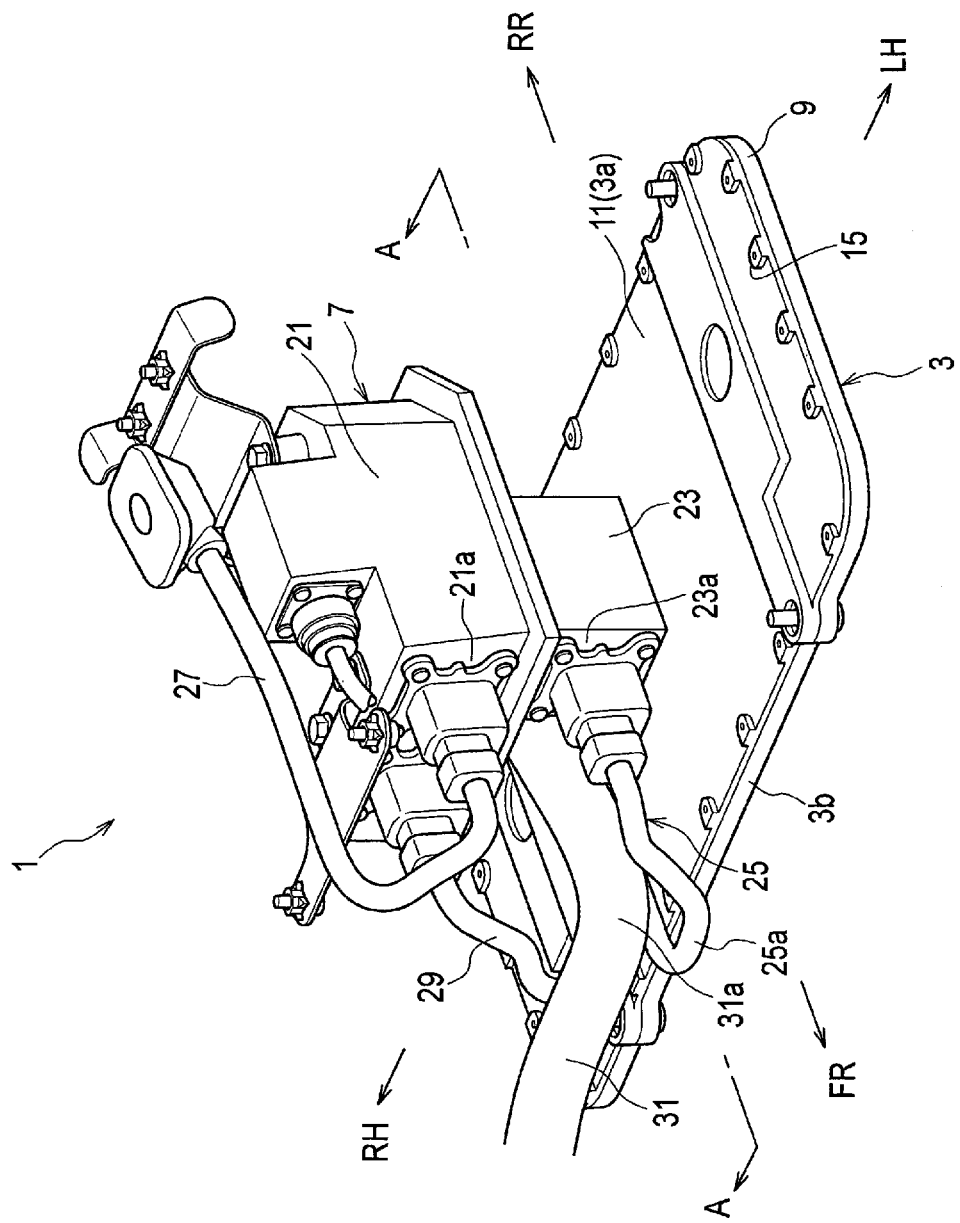
FIG. 1 It is a perspective view showing a contactless charging device for a vehicle according to a first embodiment of the present invention.

As shown in FIG. 1, a contactless charging device 1 for a vehicle according to the first embodiment includes an electricity receiving coil unit 3 having an electricity receiving coil that generates heats due to its electrical conduction, an electric component storage box 7 having at least a rectifier 5, and harnesses electrically connecting the electricity receiving coil unit 3 and the electric component storage box 7 with each other. The contactless charging device 1 for a vehicle is disposed beneath a floor panel of a vehicle body.

Figure 2:
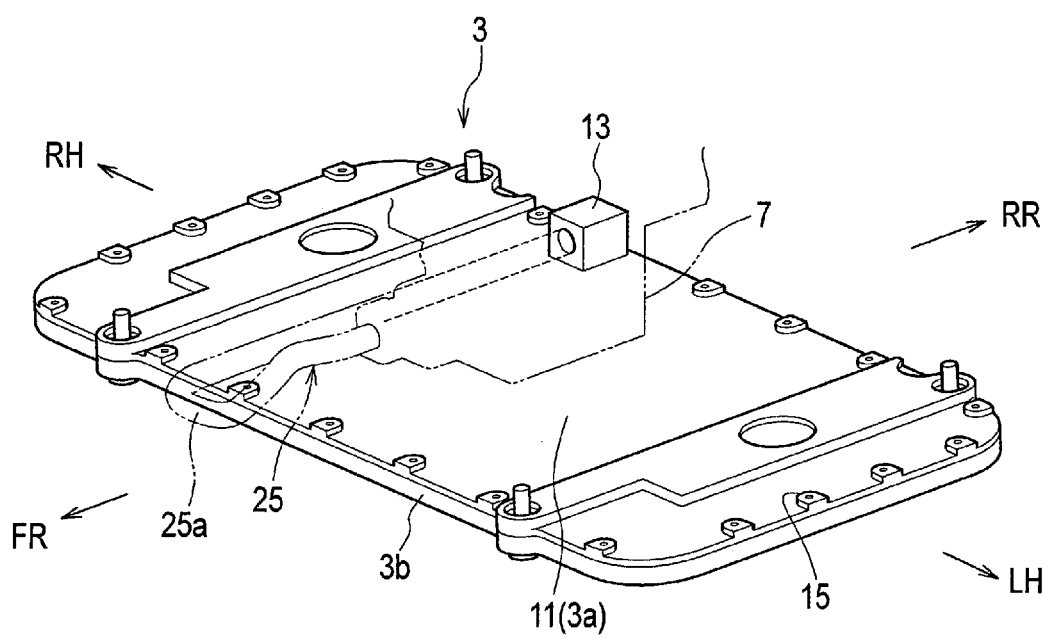
FIG. 2 It is a perspective view showing an electricity receiving coil unit in FIG. 1.
Figure 3:
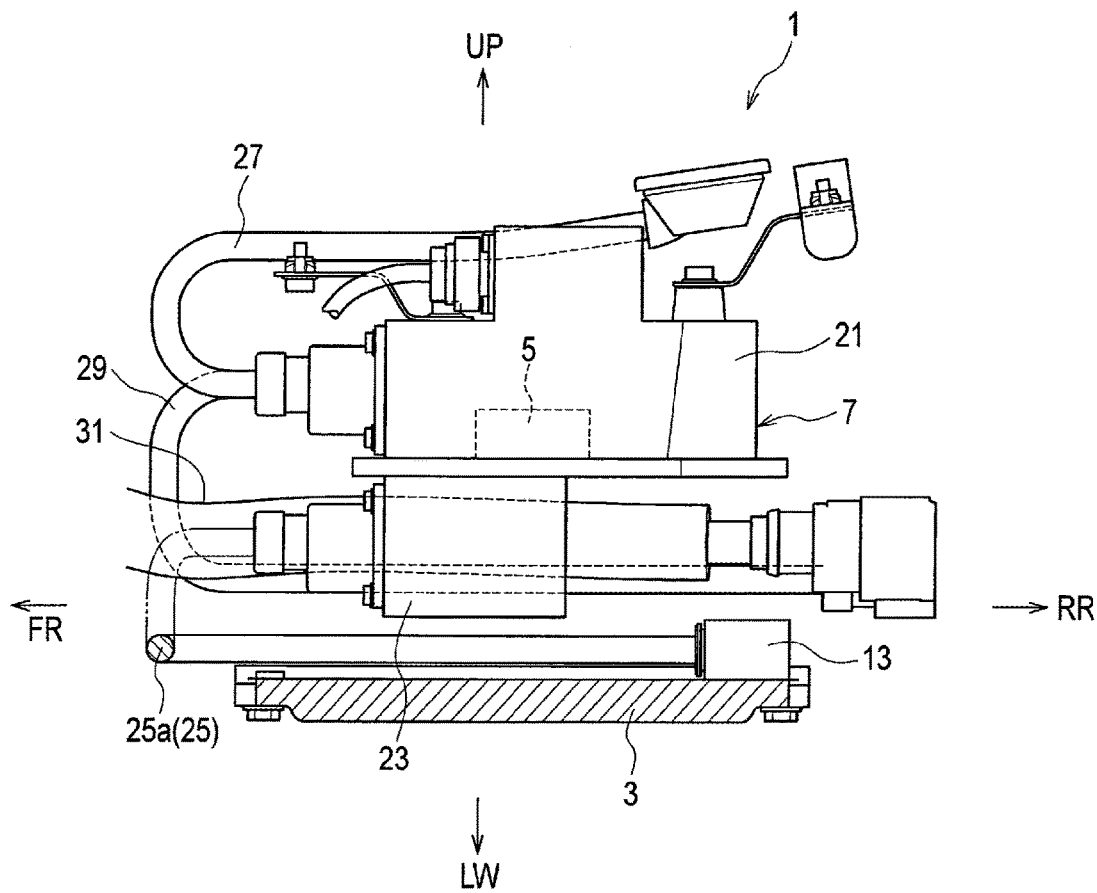
FIG. 3 It is a cross-sectional view taken along a line A-A in FIG. 1.

As shown in FIG. 1 to FIG. 3, the electricity receiving coil unit 3 is disposed at a lowermost side among components of the contactless charging device 1 for a vehicle. Specifically, the electricity receiving coil unit 3 is configured of a unit main body 9 which is disposed on a lower side and whose upper side is opened, a cover 11 that seals the unit main body 9 from above, a charging coil that is accommodated within the unit main body 9 and is not shown in the drawings, and a connector 13 disposed at a rear end portion on an upper face of the cover 11. Plural bosses 15 are disposed at given intervals in a circumferential direction along a circumferential edge of the cover 11, and a bolt hole is formed at each of the bosses 15. The cover 11 can be fixed onto the unit main body 9 by inserting bolts into these bolt holes and then fastening them.

The electric component storage box 7 is disposed over the electricity receiving coil unit 3. Specifically, the electric component storage box 7 is composed of an upper electric component storage box 21 disposed at an upper position, and a lower electric component storage box 23 disposed under this upper electric component storage box 21. Note that, as shown in FIG. 3, the rectifier 5 and various electric components are accommodated within the upper electric component storage box 21.

A first sub-harness 25 extends from a front face 23a of the lower electric component storage box 23. This first sub-harness 25 extends forward from the front face 23a of the lower electric component storage box 23, and curves rightward in a vehicle width direction on a forward side of a front end 3b of an upper face 3a of the electricity receiving coil unit 3 and then extends in the vehicle width direction, and then further curves toward a rear of the vehicle and then extends rearward, and its end is connected to the connector 13. Here, part of the first sub-harness that extends in the vehicle width direction composes a vehicle width direction extending portion 25a. In this manner, the vehicle width direction extending portion 25a (at least part) of the first sub-harness 25 (the harness) is routed in a vicinity of the front end 3b of the upper face 3a of the electricity receiving coil unit 3.

A second sub-harness 27 (the harness) and a third sub-harness 29 (the harness) extend from a front face 21a of the upper electric component storage box 21. The second sub-harness 27 extends forward from the front face 21a of the upper electric component storage box 21, and then curves rightward in the vehicle width direction and obliquely upward, and further curves toward the rear of the vehicle and then extends rearward. The third sub-harness 29 is extends forward from the front face 21a of the upper electric component storage box 21, and then curves and extends downward, and then further curves toward the rear of the vehicle and then extends rearward.

In addition, a main harness 31 (the harness) that connects a battery and a motor with each other is routed over the upper face 3a of the electricity receiving coil unit 3. Namely, in the vehicle body, the motor is disposed in front of the electricity receiving coil unit 3, and the battery is disposed behind the electricity receiving coil unit 3. Then, the main harness 31 for flowing electric current from the battery to the motor is routed so as to pass over the upper face 3a of the electricity receiving coil unit 3. Note that, as shown in FIG. 1, the main harness 31 extends in a front-rear direction over the upper face 3a, and forms a curving portion 31a curving rightward in the vehicle width direction at an upper side of the front end 3b of the electricity receiving coil unit 3.

Next, changes of flows of traveling air 33 generated along the upper face 3a of the electricity receiving coil unit 3 while the vehicle runs will be described.

Figure 4:
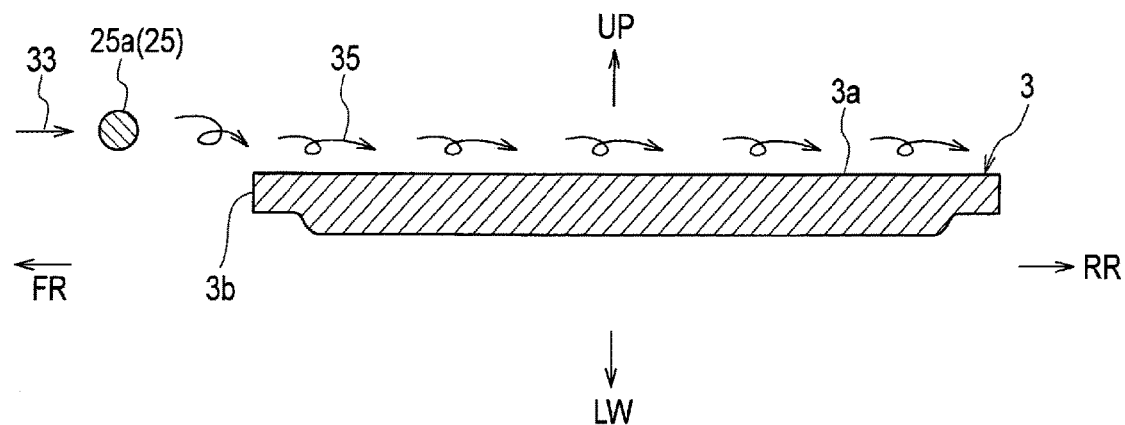
FIG. 4 It is a cross-sectional view showing a main portion extracted from FIG. 3.

When the traveling air 33 flowing from the front to the rear hits the first sub-harness 25 (the harness), the second sub-harness 27 (the harness), the third sub-harness 29 (the harness) and the main harness 31 (the harness) that are mentioned above, the traveling air 33 behind these harnesses turns into turbulence 35 as shown in FIG. 4. In particular, the turbulence 35 is readily generated by the vehicle width direction extending portion 25a (at least part) of the first sub-harness 25 (the harness) and the main harness 31. This turbulence 35 has a larger mixing effect than that of an ordinary laminar flow, and thereby flows rearwards while removing affixes on the upper face 3a of the electricity receiving coil unit 3.

Hereinafter, operational advantages according to the first embodiment will be described.

(1) It includes the electricity receiving coil unit 3 having the electricity receiving coil that generates heats due to its electrical conduction, the electric component storage box 7 having at least the rectifier 5, the harnesses 25, 27, 29 and 31 electrically connecting the electricity receiving coil unit 3 and the electric component storage box 7 with each other. At least part of the harnesses is routed in the vicinity of the front end 3b of the upper face 3a of the electricity receiving coil unit 3.

When the vehicle runs, the traveling air 33 hits at least part of the harnesses routed in the vicinity of the front end 3b of the upper face 3a of the electricity receiving coil unit 3. Then, the flows of the traveling air 33 are made turbulent by the harnesses, and thereby the flows behind these harnesses turn into the turbulence 35. This turbulence 35 flows rearward while hitting the upper face 3a of the electricity receiving coil unit 3. Therefore, even in a case where affixes such as mud or the like affixes on the upper face 3a of the electricity receiving coil unit 3, the affixes are removed by the turbulence 35 and thereby heat-radiation performance of the electricity receiving coil unit 3 can be maintained high.

(2) The part of the harnesses routed in the vicinity of the front end 3b of the upper face 3a of the electricity receiving coil unit 3 is configured by the vehicle width direction extending portion 25a extending in the vehicle width direction.

In the present embodiment, the vehicle width direction extending portion 25a of the harness(es) is formed so that its cross-sectional shape is circular. Therefore, in a case where the traveling air 33 hits the vehicle width direction extending portion 25a from the front side, airflows are made turbulent behind the vehicle width direction extending portion 25a and the affixes on the upper face 3a of the electricity receiving coil unit 3 are removed more efficiently, so that the heat-radiation performance of the electricity receiving coil unit 3 can be maintained higher.

(3) The main harness 31 that connects the battery and the motor with each other is routed over the upper face 3a of the electricity receiving coil unit 3.

The traveling air 33 generated when the vehicle runs hits the main harness 31, and thereby the turbulence 35 is generated. According to this turbulence 35 by the main harness 31, the affixes on the upper face 3a of the electricity receiving coil unit 3 can be much more efficiently, and thereby the heat-radiation performance of the electricity receiving coil unit 3 can be maintained higher.

[Second Embodiment]

Figure 5:
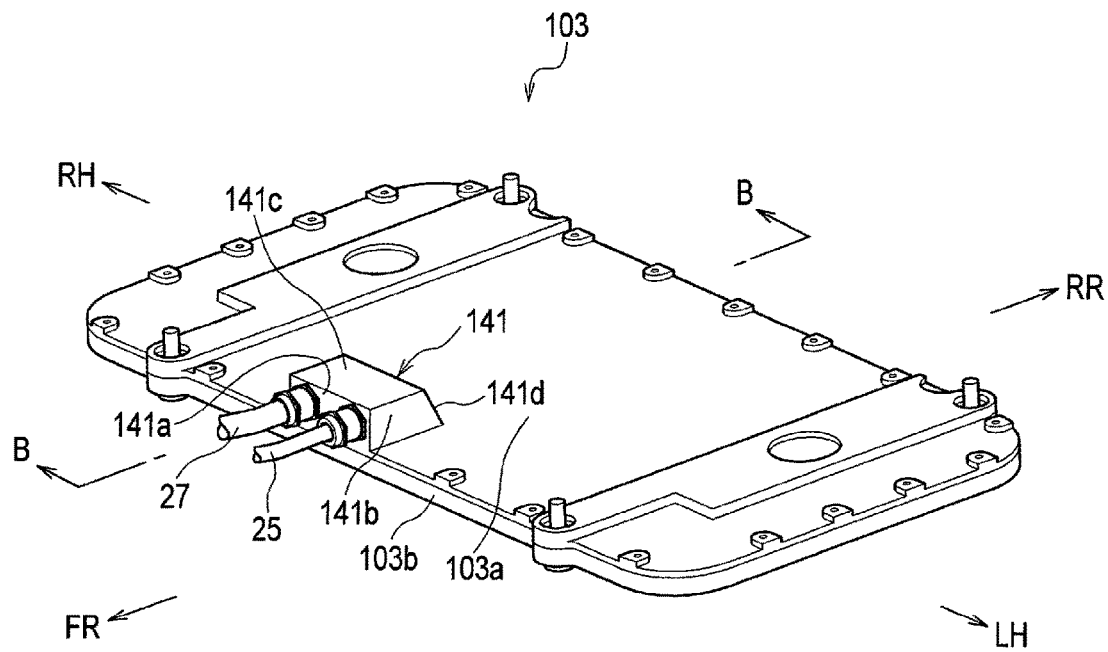
FIG. 5 It is a perspective view showing an electricity receiving coil unit according to a second embodiment of the present invention.

Hereinafter, a second embodiment of the present invention will be described by using FIG. 5 to FIG. 6. However, identical/equivalent components to those in the above-described first embodiment are labeled with identical reference signs thereto, and their detailed descriptions will be omitted.

A junction box 141 is disposed at a front portion, in the vehicle width direction, of an upper face 103a of an electricity receiving coil unit 103 according to the present embodiment. The first and second harnesses 25 and 27 (the harnesses) described in the first embodiment are connected to a front wall 141a of this junction box 141. The junction box 141 is formed by being protruded upward from the upper face 103a of the electricity receiving coil unit 103. Specifically, the junction box 141 is composed of the front wall 141a extending upward from a front end 103b of the upper face 103a of the electricity receiving coil unit 3, side walls 141b respectively extending rearward from both left and right sides of the front wall 141a, an upper wall 141c extending rearward from an upper end of the front wall 141a, and a rear wall 14I d extending obliquely downward as extending rearward from a rear end of the upper wall 141c.

Next, changes of flows of the traveling air 33 generated along the upper face 103a of the electricity receiving coil unit 103 while the vehicle runs will be described.

Figure 6:
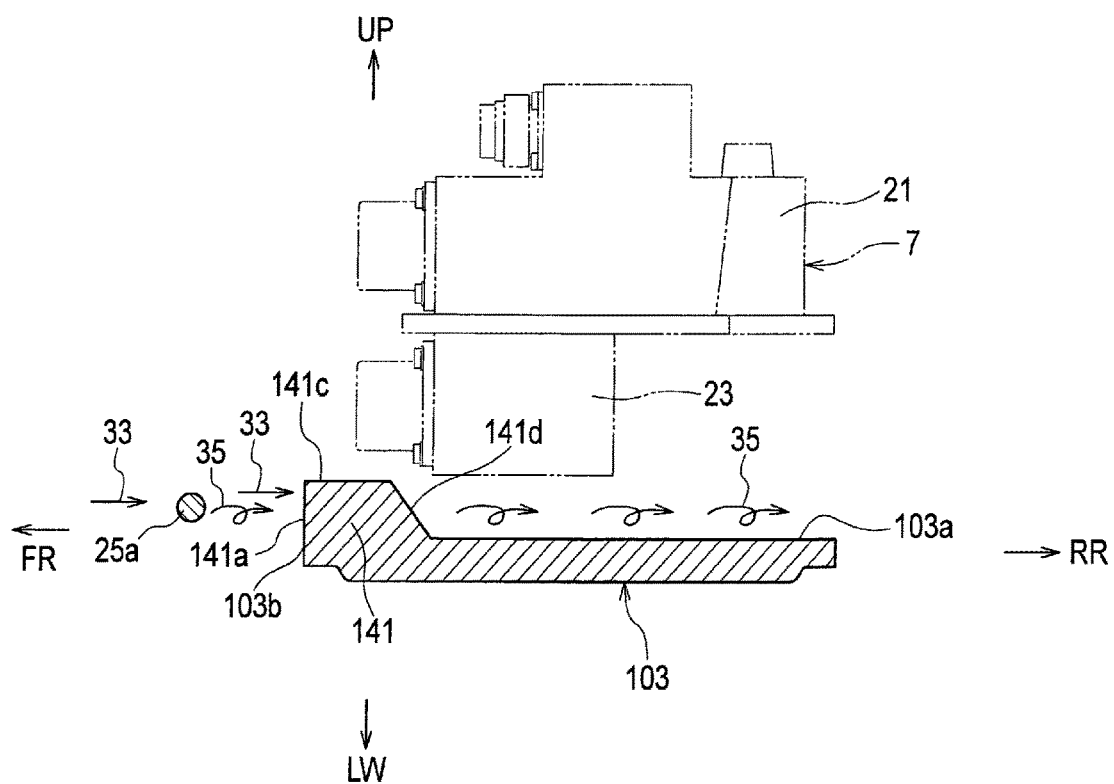
FIG. 6 It is a cross-sectional view taken along a line B-B in FIG. 5, and is equivalent to FIG. 3 according to the first embodiment.

When the traveling air 33 hits the junction box 141 according to the present embodiment in addition to the first sub-harness 25, the second sub-harness 27, the third sub-harness 29 and the main harness 31 that are mentioned above, the traveling air 33 behind these harnesses and the junction box 141 turns into the turbulence 35 as shown in FIG. 6. In particular, in the present embodiment, the turbulence 35 is readily generated by the vehicle width direction extending portion 25a of the first sub-harness 25 and the front wall 141a of the junction box 141. This turbulence 35 has a larger mixing effect than that of an ordinary laminar flow, and thereby it flows rearwards while removing affixes on the upper face 103a of the electricity receiving coil unit 103.

Hereinafter, operational advantages according to the second embodiment will be described.

(1) The junction box 141 that electrically connects the electricity receiving coil of the electricity receiving coil unit 103 and the first sub-harness 25 extending from the electric component storage box 7 with each other is disposed at the front portion of the upper face 103a of the electricity receiving coil unit 103.

The junction box 104 protrudes upward from the upper face 103a of the electricity receiving coil unit 103. Therefore, when the traveling air 33 hits the junction box 141, the turbulence 35 is generated behind the junction box 141. According to this turbulence 35, the affixes on the upper face 103a of the electricity receiving coil unit 103 are removed more efficiently, and thereby the heat-radiation performance of the electricity receiving coil unit 103 can be maintained higher.

[Third Embodiment]

Figure 7:
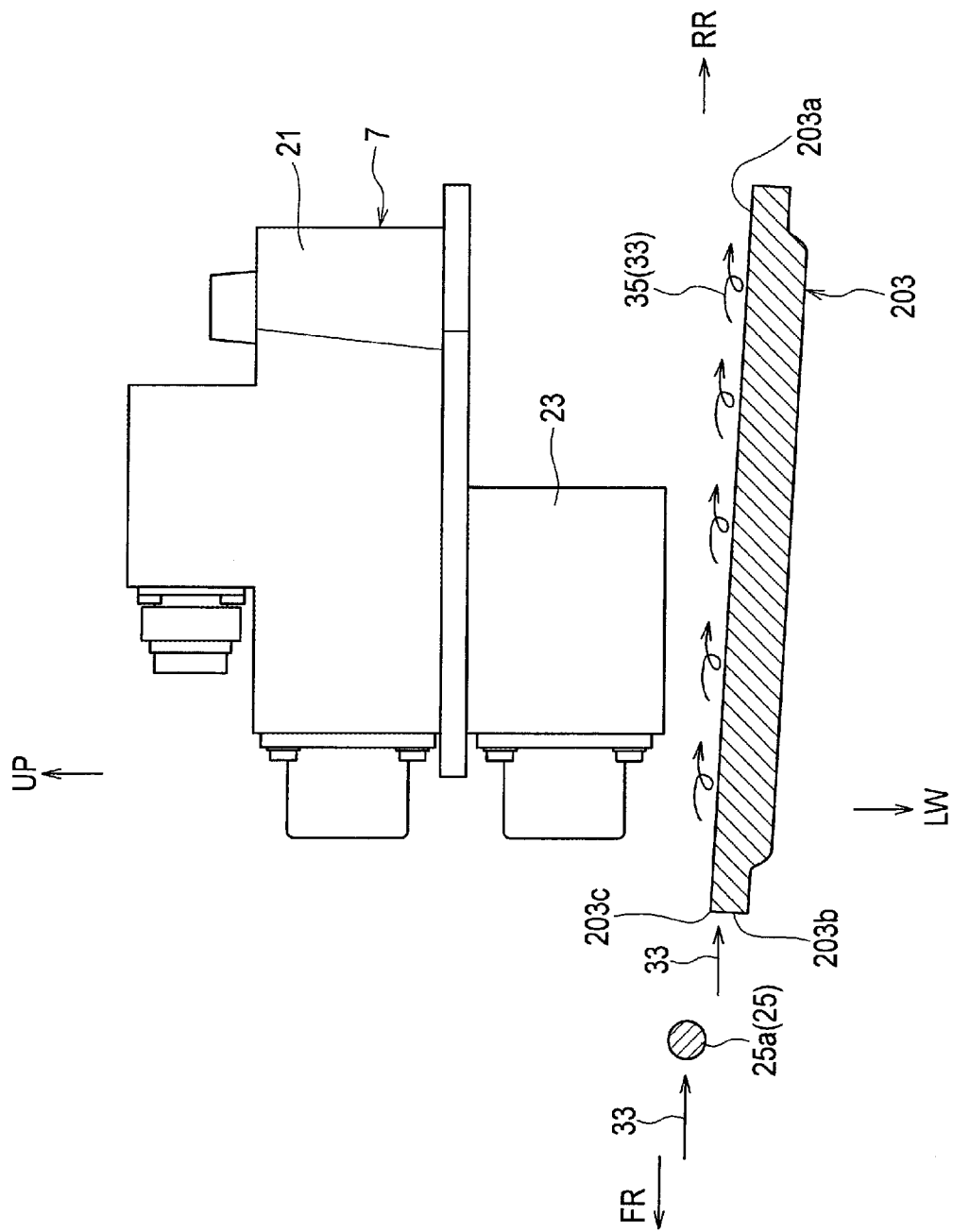
FIG. 7 It is a cross-sectional view showing a contactless charging device for a vehicle according to a third embodiment of the present invention, and is equivalent to FIG. 3 according to the first embodiment.

Hereinafter, a third embodiment of the present invention will be described by using FIG. 7. However, identical/equivalent components to those in the above-described first to second embodiments are labeled with identical reference signs thereto, and their detailed descriptions will be omitted.

In the present embodiment, an upper face 203a of an electricity receiving coil unit 203 is flat, and the upper face 203a is formed on an oblique face extending obliquely downward as extending toward the rear of the vehicle.

Specifically, the upper face 203a of the electricity receiving coil unit 203 is formed on the oblique face extending obliquely downward as extending toward the rear of the vehicle by obliquely holding the electricity receiving coil unit 203 according to the first embodiment so as to make its front side high and make its rear side lower. Therefore, an upper-end corner 203c of the front end 203b is located at a higher position than a rear end of the upper face 203a, and thereby the traveling air 33 of the vehicle hits the upper-end corner 203c and then turns into the turbulence 35 behind the upper-end corner 203c.

Hereinafter, operational advantages according to the third embodiment will be described.

(1) The upper face 203a of the electricity receiving coil unit 203 is flat, and the upper face 203a is formed on an oblique face extending obliquely downward as extending toward the rear of the vehicle.

The upper-end corner 203c (the front portion) of the upper face 203a of the electricity receiving coil unit 203 is disposed higher than the rear portion thereof. Therefore, in a case where the traveling air 33 hits the upper-end corner 203c of the upper face 203a of the electricity receiving coil unit 203, the turbulence 35 is generated behind the upper-end corner 203c. According to this turbulence 35, the affixes on the upper face 203a of the electricity receiving coil unit 203 are removed more efficiently, and thereby the heat-radiation performance of the electricity receiving coil unit 203 can be maintained higher.

[Fourth Embodiment]

Figure 8:
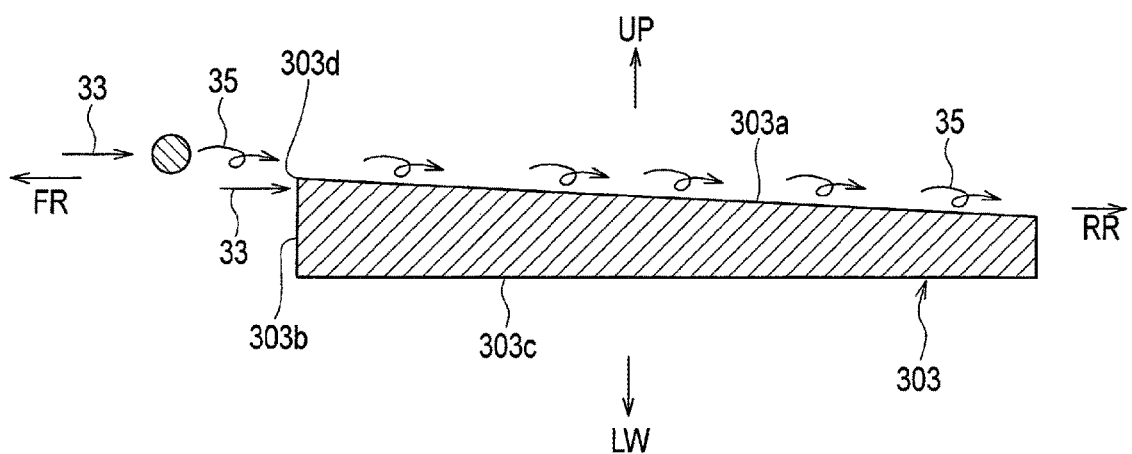
FIG. 8 It is a cross-sectional view showing an electricity receiving coil unit according to a fourth embodiment of the present invention, and is equivalent to FIG. 4 according to the first embodiment.

Hereinafter, a fourth embodiment of the present invention will be described by using FIG. 8. However, identical/equivalent components to those in the above-described first to third embodiments are labeled with identical reference signs thereto, and their detailed descriptions will be omitted.

In the present embodiment, an upper face 303a of an electricity receiving coil unit 303 is flat, and the upper face 303a is formed on an oblique face extending obliquely downward as extending toward the rear of the vehicle.

Specifically, the electricity receiving coil unit 303 according to the fourth embodiment is formed so that its thickness in a vertical direction is made thinner as extending from its front side toward its rear side. Namely, a bottom face 303c is formed as a horizontal plane without obliquity, but the upper face 303a is formed on the oblique face extending obliquely downward as extending toward the rear of the vehicle. Therefore, an upper-end corner 303d of the front end 303b is located at a higher position than a rear end of the upper face 303a, and thereby the traveling air 33 of the vehicle hits the upper-end corner 303d and then turns into the turbulence 35 behind the upper-end corner 303d.

Hereinafter, operational advantages according to the fourth embodiment will be described.

(1) The upper face 303a of the electricity receiving coil unit 303 is flat, and the upper face 303a is formed on the oblique face extending obliquely downward as extending toward the rear of the vehicle.

The upper-end corner 303d (the front portion) of the upper face 303a of the electricity receiving coil unit 303 is disposed higher than the rear portion thereof. Therefore, in a case where the traveling air hits the upper-end corner 303d of the upper face 303a of the electricity receiving coil unit 303, the turbulence 35 is generated behind the upper-end corner 303d. According to this turbulence 35, the affixes on the upper face 303a of the electricity receiving coil unit 303 are removed more efficiently, and thereby the heat-radiation performance of the electricity receiving coil unit 303 can be maintained higher.

[Fifth Embodiment]

Figure 9:
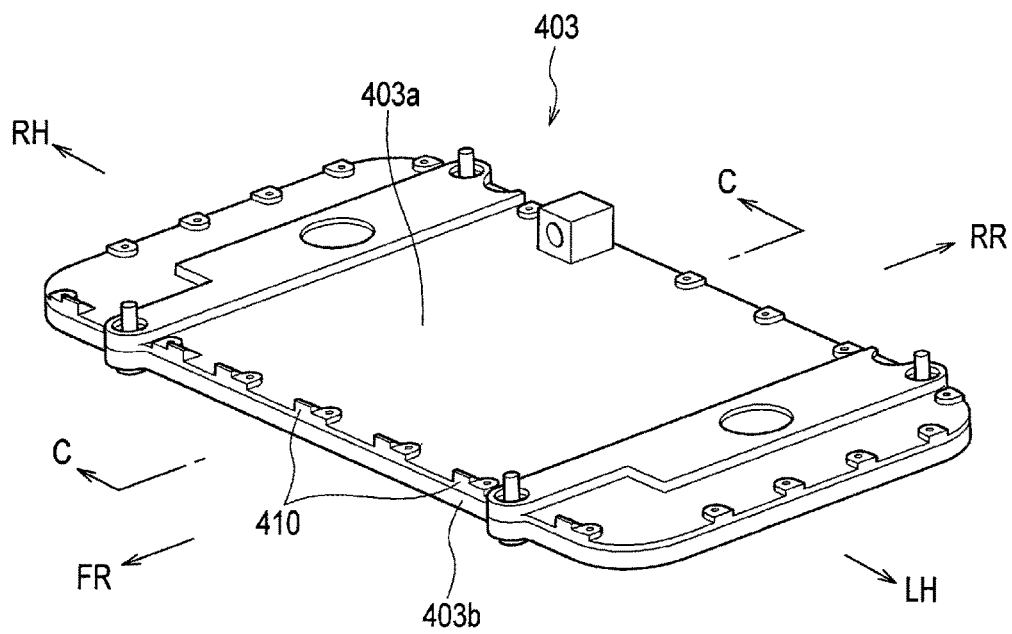
FIG. 9 It is a perspective view showing an electricity receiving coil unit according to a fifth embodiment of the present invention.
Figure 10:
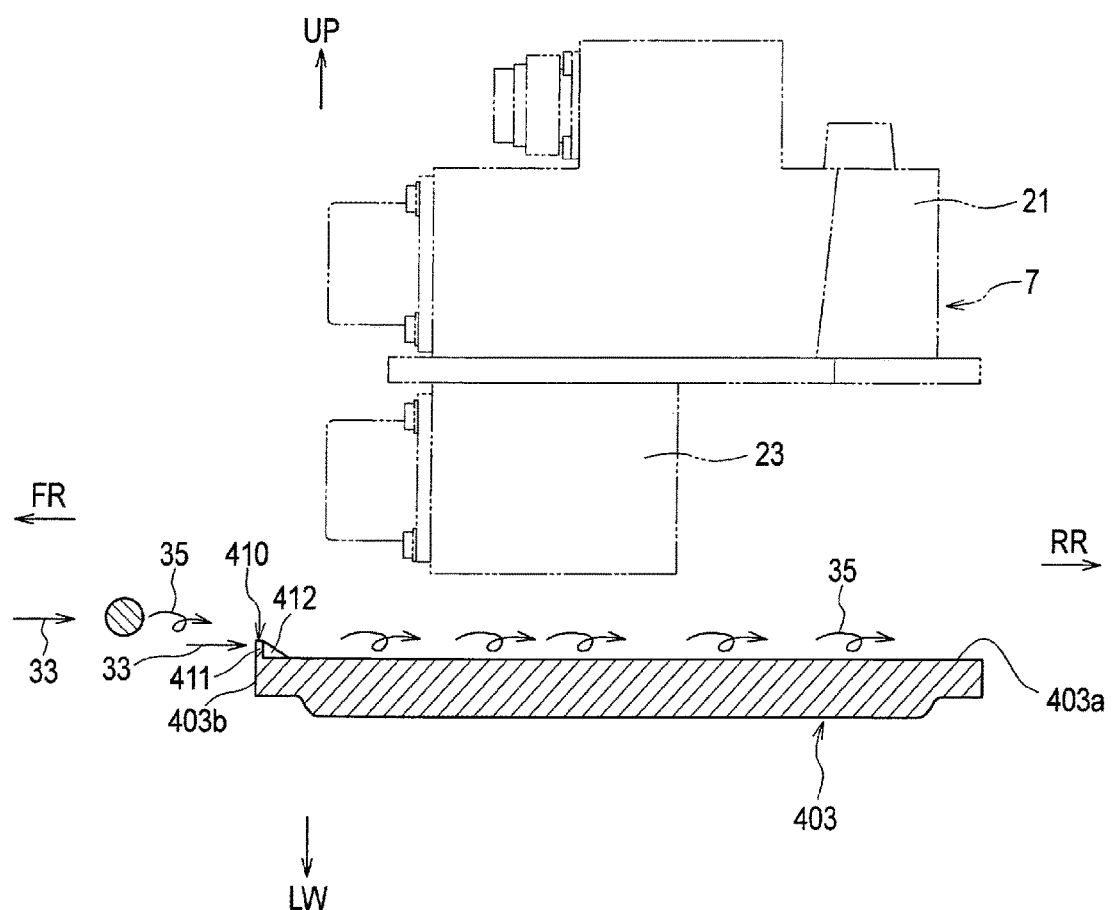
FIG. 10 It is a cross-sectional view taken along a line C-C in FIG. 9, and is equivalent to FIG. 3 according to the first embodiment.

Hereinafter, a fifth embodiment of the present invention will be described by using FIG. 9 to FIG. 10. However, identical/equivalent components to those in the above-described first to fourth embodiments are labeled with identical reference signs thereto, and their detailed descriptions will be omitted.

In the present embodiment, plural protrusions 410 protruding upward are disposed along the vehicle width direction at intervals at a front portion of an upper face 403a of an electricity receiving coil unit 403. Specifically, the plural protrusions 410 are arranged along the vehicle width direction at equivalent intervals at a front end of the upper face 403a of the electricity receiving coil unit 403. Each of the protrusions 410 is composed of a vertical wall 411 extending upward from the front end 403b of the electricity receiving coil unit 403, and a reinforcing member 412 that connects a back face of the vertical wall 411 with the upper face 403a of the electricity receiving coil unit 403 and is triangular when viewed from its side.

Hereinafter, operational advantages according to the fifth embodiment will be described.

(1) The plural protrusions 410 protruding upward are disposed along the vehicle width direction at intervals at the front portion of the upper face 403a of the electricity receiving coil unit 403.

In a case where the traveling air 33 hits the protrusions 410 of the upper face 403a of the electricity receiving coil unit 403, the turbulence 35 is generated behind the protrusions 410. According to this turbulence 35, the affixes on the upper face 403a of the electricity receiving coil unit 403 are removed more efficiently, and thereby the heat-radiation performance of the electricity receiving coil unit 403 can be maintained higher.

Note that the present invention is not limited to the above-described embodiments, and various modifications and changes can be adopted.

For example, no underbody shield cover is disposed at a lower portion of the vehicle body above embodiments, but an underbody shield may be disposed beneath the electricity receiving coil unit 3, 103, 203, 303 or 403. In addition, the vehicle width direction extending portion 25a of the first sub-harness 25 is routed on a forward side of the front end 3b of the upper face 3a of the electricity receiving coil unit 3, but it may be disposed above the front portion of the upper face 3a of the electricity receiving coil unit 3.

REFERENCE SIGNS LIST

| | |
|---|---|
| 3, 103, 203, 303, 403 | electricity receiving coil unit |
| 3a, 103a, 203a, 303a, 403a | upper face of the electricity receiving coil unit |
| 3b, 103b, 203b, 303b, 403b | front end of the electricity receiving coil unit |
| 5 | rectifier |
| 7 | electric component storage box |
| 25 | first sub harness (harness) |
| 25a | vehicle width direction extending portion |
| 31 | main harness (harness) |
| 141 | junction box |
| 410 | protrusion |

The invention claimed is:

1. A contactless charging device for a vehicle, comprising:
an electricity receiving coil unit having an electricity receiving coil that generates heats due to electrical conduction thererof;
an electric component storage box having at least a rectifier;
a first harness electrically connecting the electricity receiving coil unit and the electric component storage box with each other; and
a main harness,
wherein the electricity receiving coil unit, the electric component storage box, and the first harness are disposed beneath a floor panel of a vehicle body,
wherein at least part of the first harness is routed in a vicinity of a front end of an upper face of the electricity receiving coil unit, the front end being oriented toward a front of the vehicle,
wherein the electric component storage box is disposed above the upper face of the electricity receiving coil unit, and
wherein the main harness is routed such that the main harness passes between the upper face of the electricity receiving coil unit and the electric component storage box, and connects a battery and a motor with each other.

2. The contactless charging device for a vehicle according to claim 1, wherein
the first harness routed in the vicinity of the front end of the upper face of the electricity receiving coil unit is configured to include a vehicle width direction extending portion extending along a vehicle width direction as the part thereof.

3. The contactless charging device for a vehicle according to claim 1, wherein
a junction box that electrically connects the electricity receiving coil of the electricity receiving coil unit with the first harness extending from the electric component storage box is disposed at a front portion on the upper face of the electricity receiving coil unit.

4. The contactless charging device for a vehicle according to claim 1, wherein
the upper face of the electricity receiving coil unit is flat, and the upper face is an oblique face extending obliquely downward with respect to a horizontal plane of the vehicle body as extending toward a rear of the vehicle.

5. The contactless charging device for a vehicle according to claim 1, wherein
a plurality of protrusions protruding upward are disposed along a vehicle width direction at intervals at a front portion of the upper face of the electricity receiving coil unit.

* * * * *